(12) United States Patent
Lu

(10) Patent No.: US 7,892,664 B2
(45) Date of Patent: Feb. 22, 2011

(54) MAGNETIC RECORDING MEDIA HAVING A CHEMICALLY ORDERED MAGNETIC LAYER

(75) Inventor: Bin Lu, San Ramon, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 116 days.

(21) Appl. No.: 11/946,463

(22) Filed: Nov. 28, 2007

(65) Prior Publication Data

US 2009/0136782 A1    May 28, 2009

(51) Int. Cl.
G11B 5/66    (2006.01)

(52) U.S. Cl. .................................................. 428/831.2

(58) Field of Classification Search ....................... None
See application file for complete search history.

(56) References Cited

U.S. PATENT DOCUMENTS

| 6,007,623 A | 12/1999 | Thiele | 117/95 |
|---|---|---|---|
| 6,086,974 A | 7/2000 | Thiele | 428/65.3 |
| 6,280,813 B1 * | 8/2001 | Carey et al. | 428/828 |
| 6,428,906 B1 * | 8/2002 | Wong et al. | 428/611 |
| 6,562,489 B2 * | 5/2003 | Abarra et al. | 428/831 |
| 6,599,646 B2 | 7/2003 | Suzuki | 428/694 |
| 6,605,321 B1 | 8/2003 | Ravelosona-Ramasitera | 427/528 |
| 6,777,112 B1 * | 8/2004 | Girt et al. | 428/828 |
| 6,824,817 B2 | 11/2004 | Araki | 427/131 |
| 6,846,583 B2 * | 1/2005 | Inaba et al. | 428/831 |
| 6,863,998 B2 * | 3/2005 | Koda et al. | 428/832.2 |
| 6,881,503 B2 | 4/2005 | Lu | 428/694 |
| 7,038,873 B2 | 5/2006 | Shimazaki | 360/59 |
| 2003/0186086 A1 * | 10/2003 | Abarra et al. | 428/694 TS |
| 2004/0072027 A1 | 4/2004 | Lu | 428/694 |
| 2005/0106422 A1 | 5/2005 | Lu | 428/694 |
| 2005/0202287 A1 | 9/2005 | Lu | 428/831.2 |

FOREIGN PATENT DOCUMENTS

WO    WO2004/038702    *    5/2004

OTHER PUBLICATIONS

Jin, Z.Q. and Liu, J.P., "Rapid Thermal Processing of Magnetic Materials," Journal of Physics D: Applied Physics, V. 39, No. 14, pp. R227-R244 (2006).

Laughlin, D.E., Srinivasan, K., Tanase, M., and Wang, L., "Crystallographic Aspects of L1o Magnetic Materials," Scripta Materialia, vol. 53, pp. 383-388 (2005).

* cited by examiner

Primary Examiner—Holly Rickman
(74) Attorney, Agent, or Firm—Alan G. Rego; Westman, Champlin & Kelly, P.A.

(57) ABSTRACT

A thin film structure having a magnetic layer and a seed layer positioned adjacent to the magnetic layer is provided. The seed layer includes a $L1_0$ structure.

20 Claims, 4 Drawing Sheets

MAGNETIC RECORDING MEDIA HAVING A CHEMICALLY ORDERED MAGNETIC LAYER

GOVERNMENT RIGHTS

This invention was made with United States Government support under Agreement No. 70NANB1H3056 awarded by the National Institute of Standards and Technology (NIST). The United States Government has certain rights in the invention.

BACKGROUND

Current storage systems include a multilayer structure having a substrate, an underlayer and a magnetic layer covered by an overcoat/lubrication layer. The magnetic layer is the layer on which information can be stored by altering a direction of magnetization of the magnetic layer. It is desirable to have a magnetic layer that exhibits high magnetic anisotropy with a limited amount of thermally stable grains.

To enhance the magnetic anisotropy of the magnetic layer, grains of the magnetic layer can be chemically ordered in an $L1_0$ structure. However, room temperature as-deposited magnetic layer unit cells are generally of face centered cubic structure. These face centered cubic materials have very low magnetic anisotropy. Under sufficient heat treatment or in situ high temperature deposition, the magnetic layer can develop a chemically ordered $L1_0$ structure that gives rise to high magnetic anisotropy. However, these processes can be expensive, time consuming, and not practical for a manufacturing process.

SUMMARY

A thin film structure having a magnetic layer and a seed layer positioned adjacent to the magnetic layer is provided. The seed layer includes a $L1_0$ structure.

Additionally, a magnetic recording medium is provided. The recording medium includes a substrate and an underlayer positioned above the substrate. A seed layer is positioned above the underlayer and has a $L1_0$ structure. A magnetic layer is positioned adjacent to the seed layer.

A method is also provided that includes providing a seed layer having an $L1_0$ structure. A magnetic layer having a $L1_0$ structure is provided on the seed layer.

Other features and benefits that characterize embodiments of the present invention will be apparent upon reading the following detailed description and review of the associated drawings.

DETAILED DESCRIPTION

Figure 1:
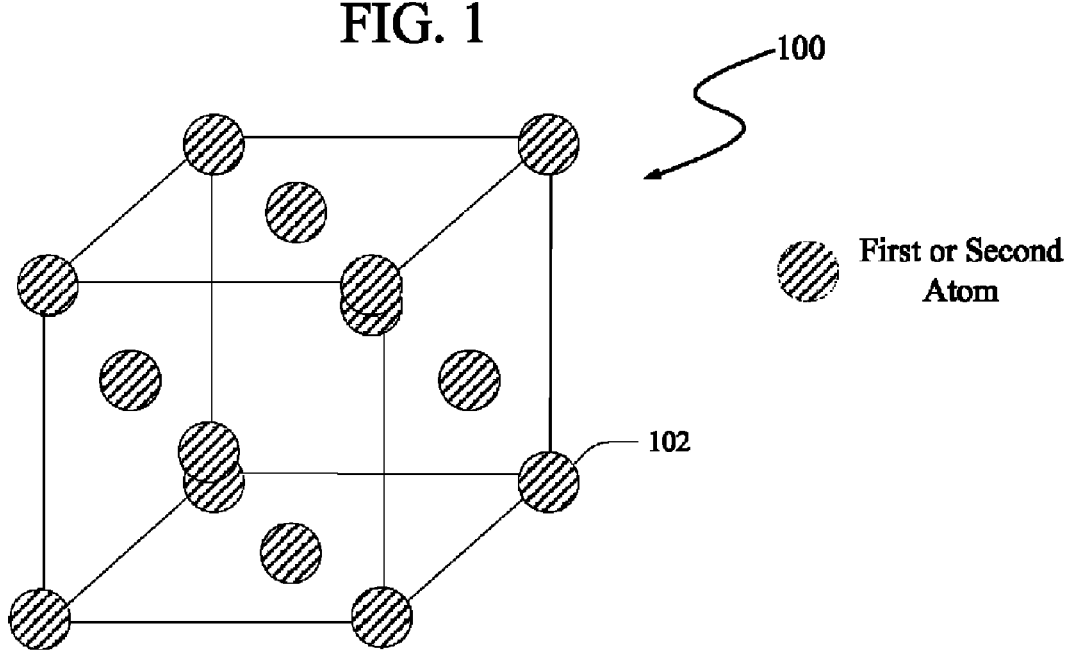
FIG. 1 is a schematic diagram of a face centered cubic structure.

A magnetic layer of a recording media can be comprised of a hard, magnetic metal alloy. For example, the magnetic alloy can be iron-platinum (FePt), cobalt-palladium (CoPd), iron-palladium (FePd) or cobalt-platinum (CoPt). The magnetic alloy can also be the above alloys with the third or more elemental dopant such as, Cu, Ni, Mn, Cr, etc. These alloys include two types of atoms that are present in chemical structures. FIG. 1 is a schematic diagram of a face centered cubic structure 100. In the face centered cubic structure 100 of FIG. 1, atoms of the magnetic alloy occupy lattice positions, for example lattice position 102, of structure 100 randomly. For example, in the case of FePt, position 102 can either be occupied by an Fe atom or a Pt atom.

Magnetic materials such as FePt, FePd, CoPd and CoPt, usually exhibit a face centered cubic structure when deposited at room temperature. When in a face centered cubic structure, magnetic alloys have a low magnetic anisotropy. By chemically ordering structure 100, a magnetic alloy can exhibit high magnetic anisotropy. A phase transformation needs to be induced in structure 100 to result in a chemically ordered structure.

Figure 2:
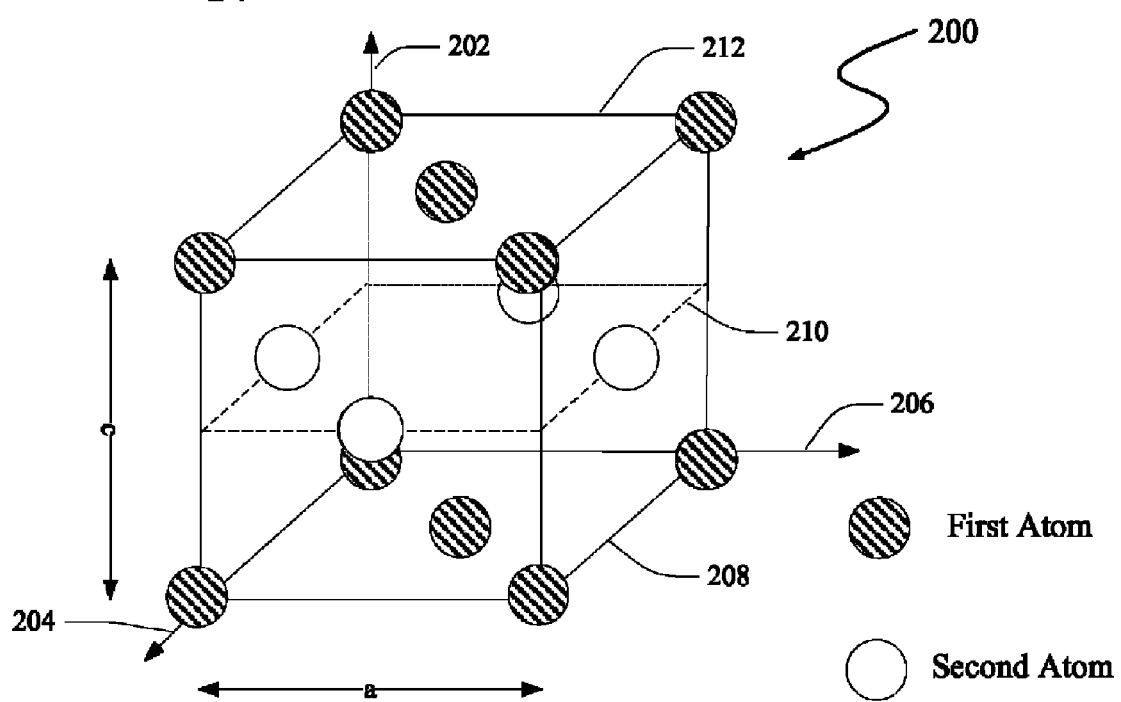
FIG. 2 is a schematic diagram of an $L1_0$ structure.

FIG. 2 is a schematic diagram of a chemically ordered $L1_0$ structure 200 relative to axes 202, 204 and 206. The $L1_0$ structure includes planes 208, 210 and 212 of atoms in which a first atom type in the structure occupies a first plane, a second atom type in the structure occupies a second, adjacent plane, and the first atom type occupies a third plane that is adjacent to the second plane. For example, plane 208 (defined by axes 204 and 206) is occupied by a first atom type in the illustrated specific positions (corners and a face center), which for example could be plantinum or palladium. Plane 210, which is adjacent to plane 208, is occupied by a second atom type in the illustrated specific positions (face centers), which for example can be iron, or cobalt. Plane 212, which is adjacent to plane 210, is again occupied by the first atom type.

Chemically ordered structures, such as the $L1_0$ structure 200, are energetically preferred at room temperature. However, deposition of films are disordered unless otherwise ordered by a suitable phase transformation. To order the atoms in a $L1_0$ structure, enough diffusivity is needed during or after deposition. Thermal energy can be applied to the atoms to let them move around until the preferred energy position is found. Several different techniques for applying thermal energy during deposition can be used such as using an infrared carbon heater, an energy emitting lamp, resistance heater, etc. Under a phase transformation process, the $L1_0$ structure 200 is then obtained as in FIG. 2.

Within a thin film structure as used in magnetic recording media, a magnetic layer will more easily reach the $L1_0$ phase when an adjacent seedlayer includes an $L1_0$ structure. In this situation, the magnetic layer will experience a tensile stress caused by the seedlayer. To reduce the stress within the magnetic layer, the magnetic layer will shift to a tetragonal shape, which will induce its $L1_0$ phase transformation. A tetragonal shape includes a height, denoted as "c" in FIG. 2, that is less than a width, denoted as "a" in FIG. 2. In $L1_0$ FePt, "a" is equal to 0.3852 nm and "c" is equal to 0.3713 nm. The shift in shape to a tetragonal structure will expedite the magnetic layer $L1_0$ phase transformation and make it occur at a lower temperature.

Seedlayers that can be used to aid in this phase transformation include aluminum-titanium (AlTi), copper-titanium (CuTi), magnesium-indium (MgIn), plantinum-zinc (PtZn), copper-gold (CuAu), and cadmium-paladium (CdPd). One common feature of these alloys is a lower melting temperature than magnetic alloys discussed above, namely FePt, FePd, CoPd and CoPt. The lower melting temperature gives rise to higher diffusivity in the seedlayer over the magnetic layer. As a result, atoms of the seedlayer can move around more easily to reach the $L1_0$ phase. The $L1_0$ structure then aids in generating the $L1_0$ phase transformation of the magnetic layer. Lattice parameters of the $L1_0$ phase seedlayers discussed above are as follows:

TABLE 1

Lattice Parameters of Seedlayers

| Alloy | a (nm) | c (nm) | c/a | Phase transformation temperature (° C.) | $T_{melt}$ alloy (° C.) | $T_{melt}$ element 1 (° C.) | $T_{melt}$ element 2 (° C.) |
|---|---|---|---|---|---|---|---|
| FePt | 3.853 | 3.713 | 0.96 | 1300 | 1580 | 1536 | 1772 |
| AlTi | 3.976 | 4.049 | 1.02 | 1460 | 1460 | 660 | 1670 |
| CuTi | 4.440 | 2.856 | 0.64 | 982 | 982 | 1085 | 1670 |
| MgIn | 4.571 | 4.397 | 0.96 | 340 | 400 | 157 | 649 |
| PtZn | 4.027 | 3.474 | 0.86 | >900 | >900 | 1772 | 420 |
| AuCu | 3.960 | 3.670 | 0.93 | 385 | 910 | 1065 | 1085 |
| CdPd | 4.277 | 3.620 | 0.85 | >800 | >800 | 321 | 1552 |

Another feature of the above listed alloys is that there is very small or zero temperature gap between $L1_0$ phase transformation and melting. This indicates that when an alloy is formed from a liquid phase or vapor phase, the alloy will directly form into a $L1_0$ structure rather than form a face centered cubic or other structure.

Figure 3:
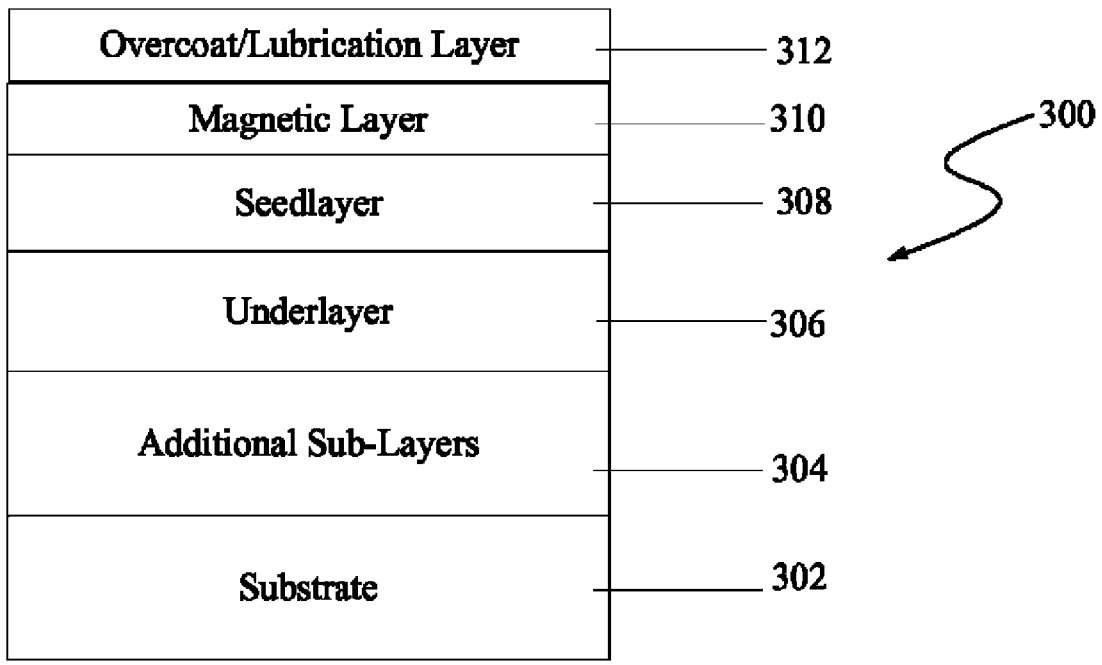
FIG. 3 is a schematic diagram of a thin film structure.

FIG. 3 illustrates a thin film structure 300 that includes a substrate 302, additional sub-layers 304, underlayer 306, seedlayer 308, magnetic layer 310 and an overcoat/lubrication layer 312. Substrate 302 forms a base of thin film structure 300 and can be made of any suitable material such as ceramic glass, amorphous glass or nickel-phosphorous (NiP) plated aluminum-magnesium (AlMg). Additional sub-layers 304 can include adhesion layers such as titanium (Ti), tantalum (Ta), and titanium chromium (TiCr) etc. as desired to serve as an interface between substrate 302 and underlayer 306. Sub-layers 304 can also include heat sink layers that control the thermal properties of the whole media. Possible heat sink materials include copper (Cu), silver (Ag), gold (Au), aluminum (Al), tungsten (W), ruthenium (Ru), and their alloys among themselves or with other elements.

Underlayer 306 is optional and, if used, can comprise several layers. It is used to improve orientation distribution as well as enhance epitaxial growth (i.e. to form the same structure) of the seedlayer 308. Some materials which can be used as an underlayer 306 include magnesium oxide (MgO), or an oxide with sodium chloride (NaCl) structure. etc. Metals and alloys of similar lattice parameter to the MgO can be used as second underlayer on top of MgO to further enhance the (100) orientation and the epitaxial growth between the underlayer and the $L1_0$ seedlayer. These metals can be chromium (Cr), nickel-aluminum (NiAl), ruthenium-aluminum (RuAl), etc. Underlayer 306 has a (100) orientation and seedlayer 308 is grown epitaxially in a (001) orientation on top of underlayer 306. Additionally, seedlayer 308 can be grown together with oxides such as, MgO, silicon dioxide ($SiO_2$), titanium dioxide ($TiO_2$), tantalum oxide ($Ta_2O_5$) or niobium oxide ($Nb_2O_5$) to form granular structures. Magnetic layer 310 is grown on seedlayer 308 into a continuous or granular microstructure for patterned media and/or heat assisted magnetic recording (HAMR) media. Optionally, an overcoat/lubrication layer 312 can also be placed about the exterior surface of the magnetic recording media.

Figure 4:
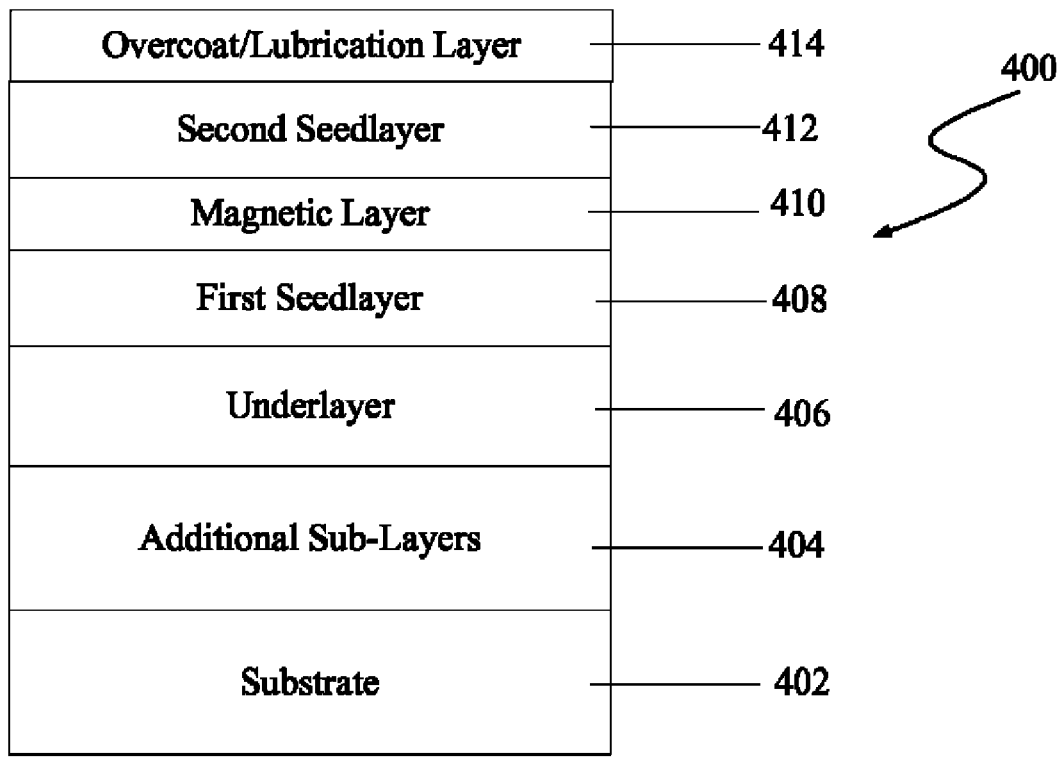
FIG. 4 is a schematic diagram of a thin film structure having two seedlayers.

FIG. 4 further illustrates another thin film structure 400 that includes a substrate 402, additional sub-layers 404, underlayer 406, first seedlayer, 408, magnetic layer 410, second seedlayer 412 and overcoat/lubrication layer 414. In addition to structure 300 of FIG. 3, structure 400 includes two seedlayers, namely first seedlayer 408 and second seedlayer 412.

Magnetic layer 410 is placed between first seedlayer 408 and a second seedlayer 412 to enhance the $L1_0$ phase transformation of magnetic layer 410.

Figure 5:
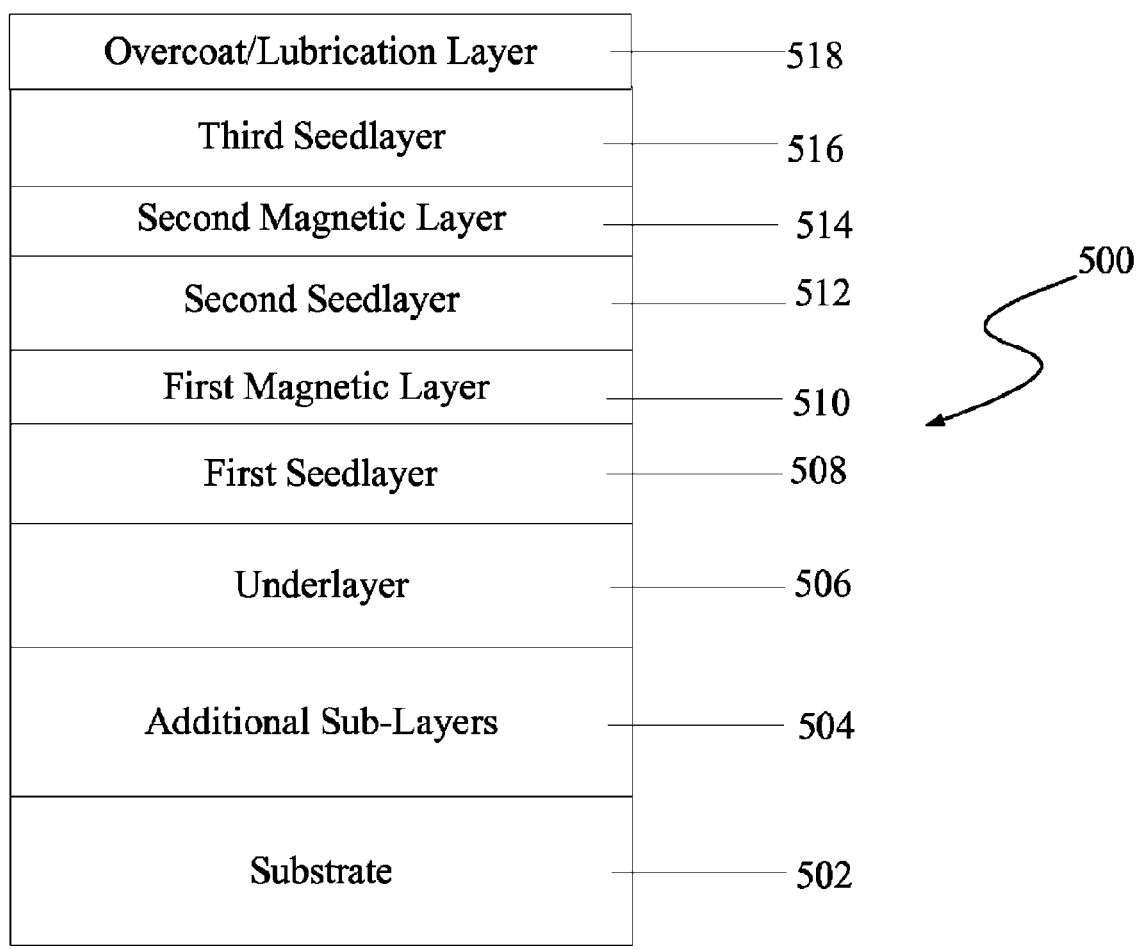
FIG. 5 is a structure of a thin film structure having three seedlayers and two magnetic layers.

FIG. 5 illustrates another exemplary thin film structure 500 that includes substrate 502, additional sub-layers 504, underlayer 506, first seedlayer 508, first magnetic layer 510, second seedlayer 512, second magnetic layer 514, third seedlayer 516 and overcoat/lubrication layer 518. In FIG. 5, there are three seedlayers 508, 512 and 516 and two magnetic layers 510 and 514. The first magnetic layer 510 is between first seedlayer 508 and second seedlayer 512. The second magnetic layer 514 is between the second seedlayer 512 and third seedlayer 516. The two magnetic layers 510 and 514 aid in providing additional magnetic signal strength within the thin film structure 500 while seedlayers 508, 512 and 516 aid in inducing an $L1_0$ phase transformation in magnetic layers 510 and 514.

Figure 6:
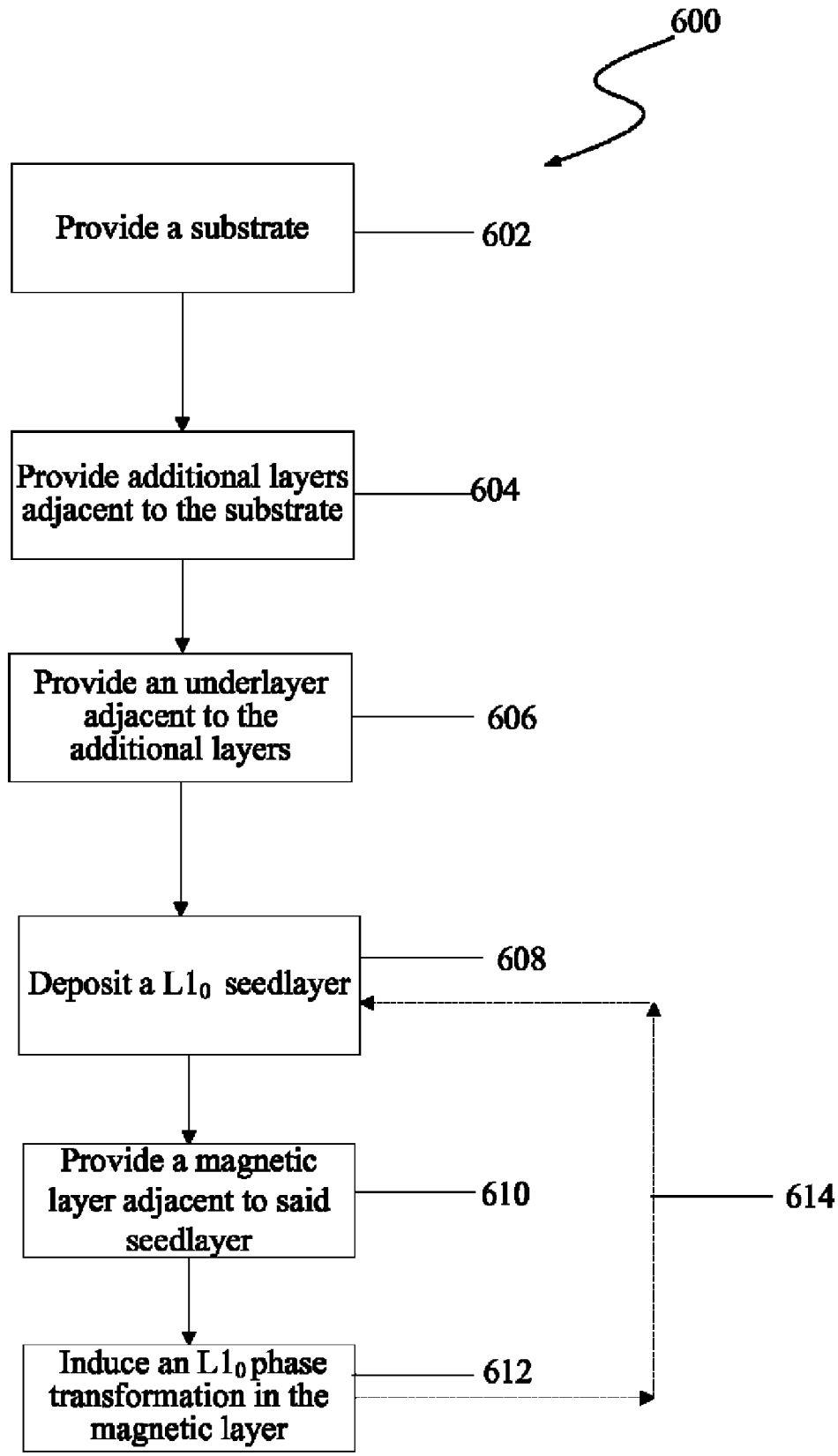
FIG. 6 is a flow chart of a method for forming a thin film structure.

FIG. 6 shows a process diagram of forming a magnetic recording media. A substrate, for example substrate 302, 402 or 502, is provided at step 602. Additional sub-layers can be provided adjacent to the substrate at step 604. An underlayer can then be provided at step 606. A seedlayer can then be deposited on the underlayer at step 608. The underlayer can aid in epitaxial growth and orientation of the seedlayer. The seedlayer can undergo a phase transformation to a $L1_0$ structure during or after deposition. A magnetic layer is then grown or placed over the seedlayer in step 610. For example, the magnetic layer can be FePt, CoPd, FePd or CoPt. An $L1_0$ phase transformation is induced at step 612. The phase transformation can be a result of external thermal energy placed on the magnetic layer, which is also aided by the $L1_0$ structure of the seedlayer.

If desired, as illustrated by loop 614, further seedlayers and/or magnetic layers can be added. For example, a further seedlayer can be placed adjacent to the magnetic layer. This seedlayer can aid in maintaining an $L1_0$ structure in the magnetic layer. If desired, a second magnetic layer can then be placed on top of the second seedlayer. Any number of seedlayers and/or magnetic layers can be used.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the recording medium while maintaining substantially the same functionality without departing from the scope and spirit of the present invention. In addition, although the embodiment described herein is directed to a thin film structure, it will be appreciated by those skilled in the art that the teachings of the present invention can be applied to other magnetic recording materials without departing from the scope and spirit of the present invention.

What is claimed is:

1. A thin film structure comprising:
   a magnetic layer having an $L1_0$ structure;
   a seedlayer positioned adjacent to the magnetic layer, the seedlayer having a $L1_0$ structure and a (001) orientation; and
   an underlayer positioned such that the seedlayer is positioned between the underlayer and the magnetic layer, the underlayer comprising a non-magnetic material having a (100) orientation.

2. The structure of claim 1 further comprising an overcoat lubrication layer positioned such that the magnetic layer is positioned between the overcoat lubrication layer and the seedlayer.

3. The structure of claim 1 wherein the seedlayer is non magnetic and has a lower melting temperature than the magnetic layer.

4. The structure of claim 1 wherein the seedlayer is one of AlTi, CuTi, MgIn, PtZn, CuAu and CdPd that possess a $L1_0$ structure.

5. The structure of claim 1 further comprising a second seedlayer, wherein the magnetic layer is positioned between the first-mentioned seedlayer and the second seedlayer.

6. The structure of claim 5 further comprising a second magnetic layer, wherein the second magnetic layer is positioned such that the second seedlayer is positioned between the first-mentioned magnetic layer and the second magnetic layer.

7. The structure of claim 6 further comprising a third seedlayer positioned such that the second magnetic layer is positioned between the second seedlayer and the third seedlayer.

8. A magnetic recording medium, comprising:
   a substrate;
   an underlayer positioned above the substrate, the underlayer comprising a non-magnetic material having a (100) orientation;
   a seedlayer positioned above the underlayer, the seedlayer having a $L1_0$ structure; and
   a magnetic layer having an $L1_0$ structure and positioned adjacent to the seedlayer,
   wherein the seedlayer has a lower melting temperature than the magnetic layer.

9. The magnetic recording medium of claim 8 wherein the seedlayer is one of AlTi, CuTi, MgIn, PtZn, CuAu and CdPd.

10. The magnetic recording medium of claim 8 further comprising a second seedlayer, wherein the magnetic layer is positioned between the first-mentioned seedlayer and the second seedlayer.

11. The magnetic recording medium of claim 10 further comprising a second magnetic layer, wherein the second magnetic layer is positioned such that the second seedlayer is positioned between the first-mentioned magnetic layer and second magnetic layer.

12. The magnetic recording medium of claim 11 further comprising a third seedlayer positioned such that the second magnetic layer is positioned between the second seedlayer and the third seedlayer.

13. A method comprising:
    providing a seedlayer having a $L1_0$ structure;
    providing a magnetic layer having a $L1_0$ structure on the seed layer; and
    growing the seedlayer epitaxially on an non-magnetic underlayer having a (100) orientation,
    wherein the seedlayer has a lower melting temperature than the magnetic layer.

14. The method of claim 13 further comprising providing a second seedlayer adjacent the first-mentioned magnetic layer.

15. The method of claim 14 further comprising providing a second magnetic layer adjacent to the second seedlayer.

16. The structure of claim 1 wherein the magnetic layer comprises FePt.

17. The structure of claim 1 wherein the underlayer comprises MgO.

18. The magnetic recording medium of claim 8 wherein the magnetic layer comprises FePt.

19. The magnetic recording medium of claim 8 wherein the underlayer comprises MgO.

20. The method of claim 13 wherein the magnetic layer comprises FePt.

* * * * *